Jan. 31, 1967     C. W. BOPP     3,301,420
WHEEL MOUNTED UNLOADING FORK
Filed Aug. 6, 1964     6 Sheets-Sheet 1
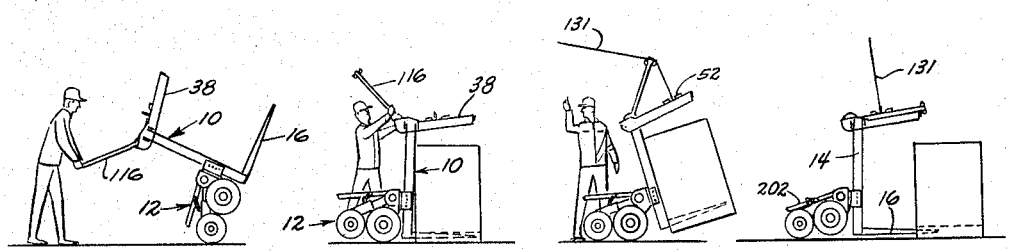
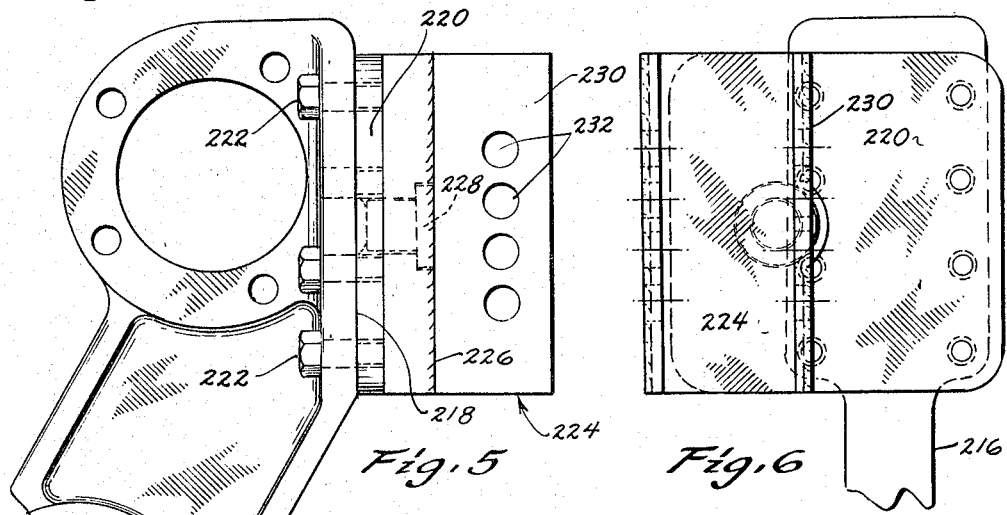
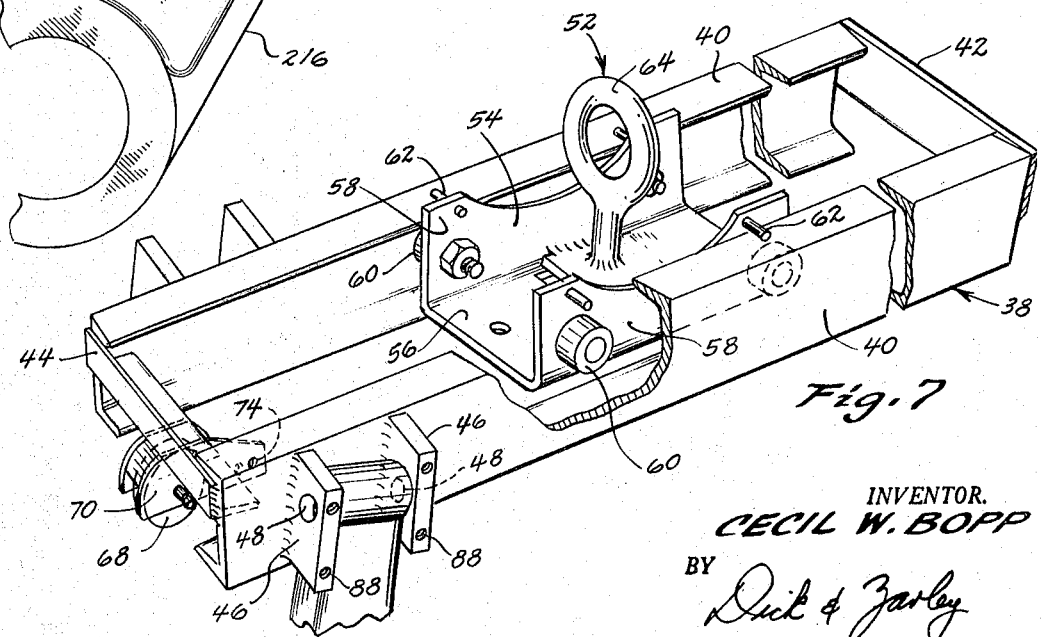
INVENTOR.
CECIL W. BOPP
BY Dick & Zarley
ATTORNEYS

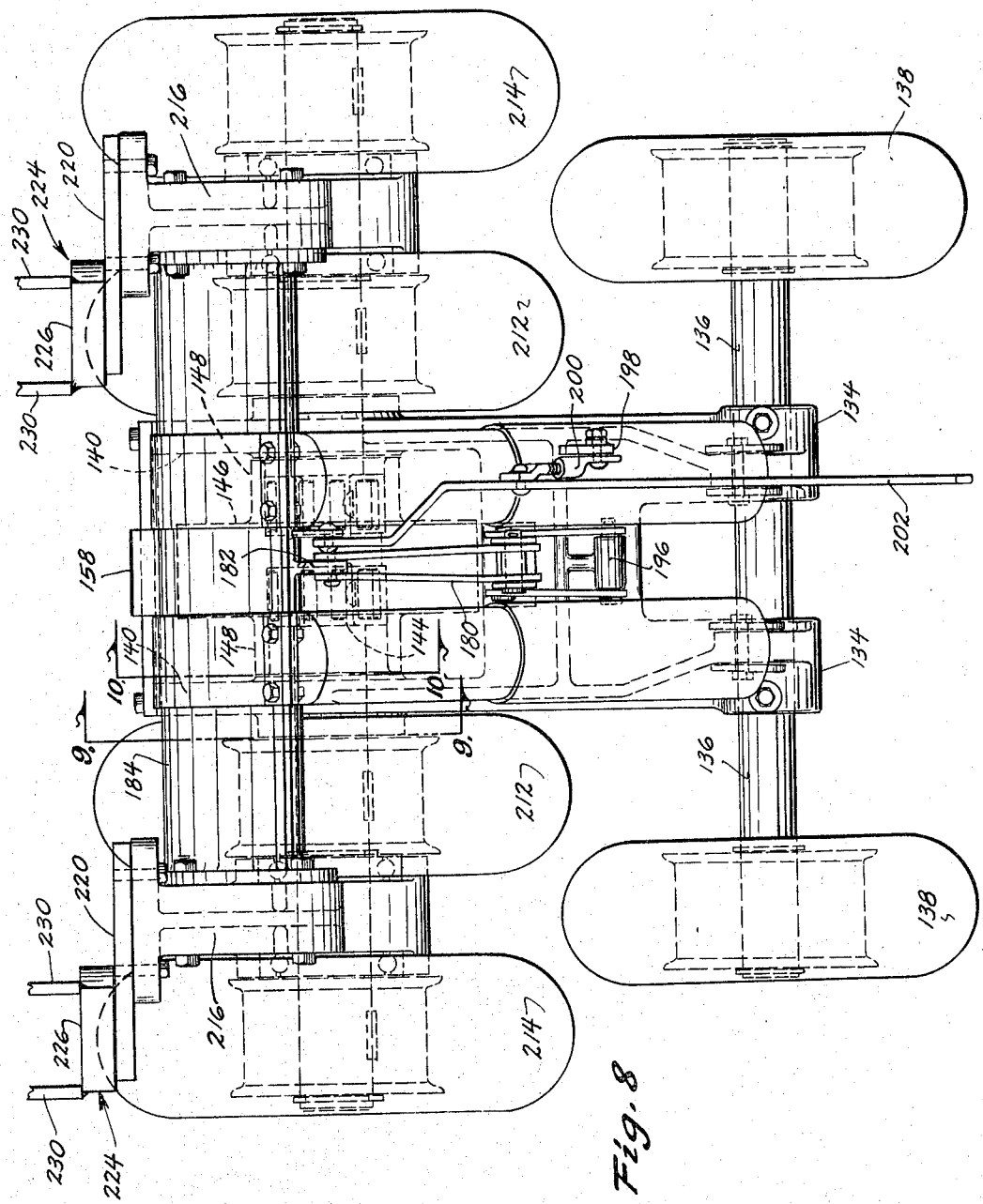

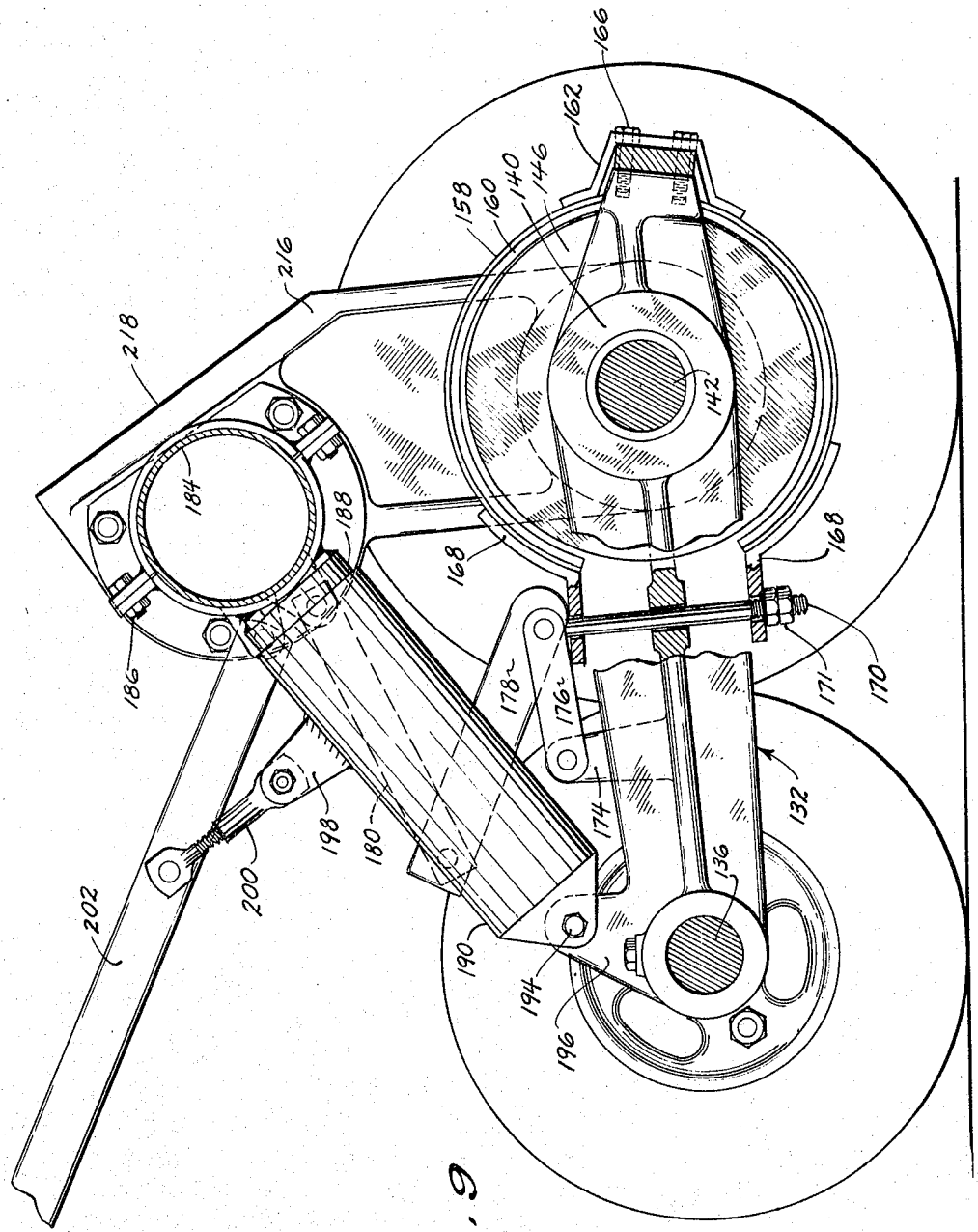

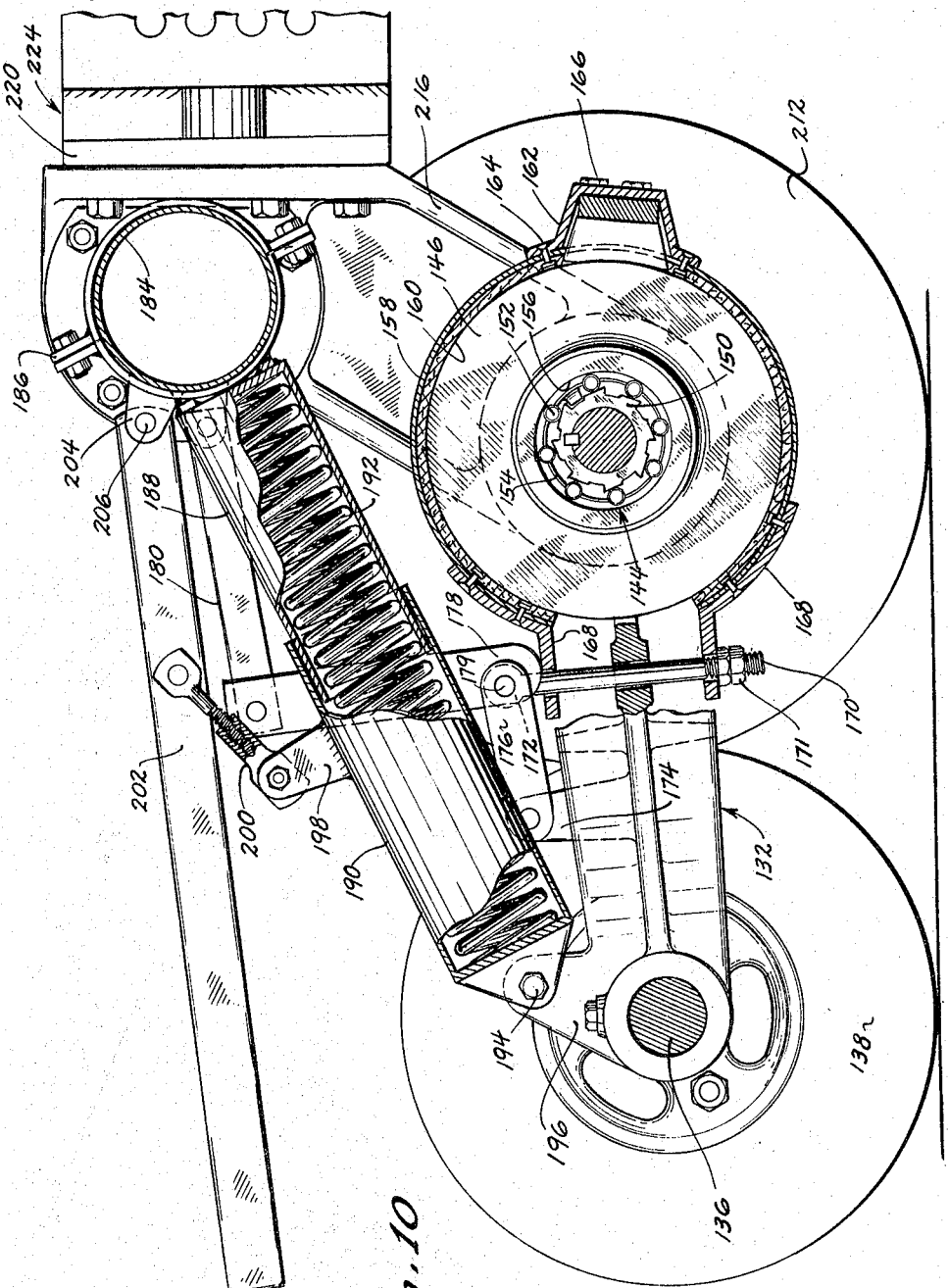

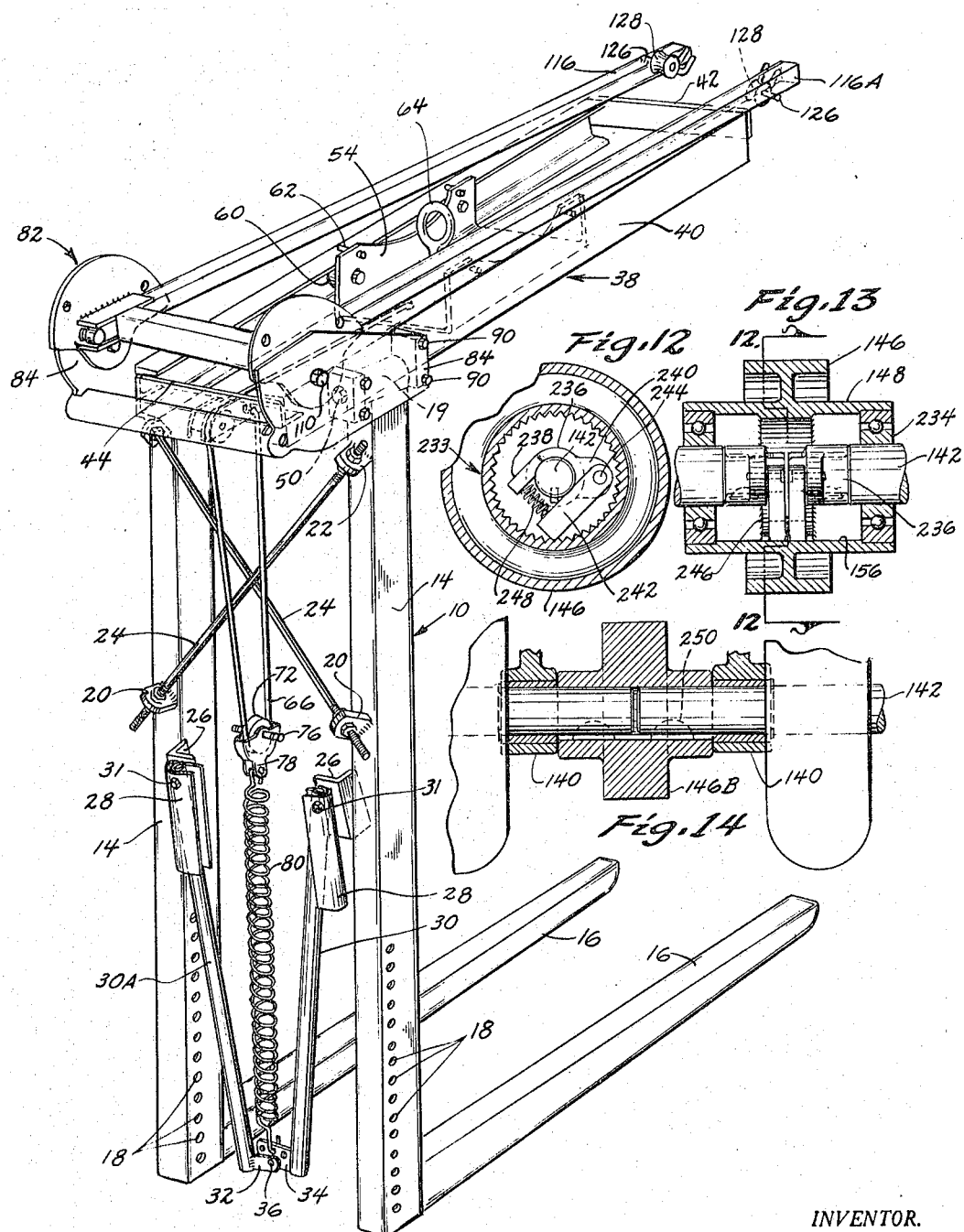

INVENTOR.
CECIL W. BOPP
BY
Dick & Farley
ATTORNEYS

United States Patent Office 3,301,420
Patented Jan. 31, 1967

3,301,420
WHEEL MOUNTED UNLOADING FORK
Cecil W. Bopp, Waterloo, Iowa, assignor to The Greater Iowa Corporation, Des Moines, Iowa, a corporation of Iowa
Filed Aug. 6, 1964, Ser. No. 387,970
19 Claims. (Cl. 214—372)

Many articles of commerce are shipped in trucks and railroad cars, and are stored in warehouses on conventional pallets. Other such articles of commerce as building blocks and the like are bound in cube form and are shipped and stored in the same manner. Removing this material from trucks, railroad cars, or warehouses and the like is a very expensive and burdensome task, particularly when powered fork units are either not able to enter the storing or unloading area, or they are not available to the unloader even if conditions would permit their use.

Even when facilities are available through powered fork units or manual labor to retrieve material of this type from the confined areas of warehouses or the shipping vehicles, the problem then arises as to the disposition of this material after it has been so retrieved. If material has been unloaded from a railroad car by a powered fork unit and deposited on a dock, separate means must then be employed to lift the material from the dock onto an awaiting truck, for example. Thus, it is not uncommon for the material to be handled at least two times by separate pieces of equipment as it is removed from a railroad car or the like and deposited in a separate storing area or deposited on a different type of carrier.

Therefore, a principal object of this invention is to provide a wheel mounted unloading fork which can easily pick up and move pallet supported loads, building block cubes and the like with cable lifting equipment wherein the cable lifting equipment is remotely located from the material to be moved.

A further object of this invention is to provide a wheel mounted unloading fork which can not only move pallet supported loads and the like along the floor of a railroad car or the like, but which can also serve to support the material as it is being lifted or otherwise moved after being withdrawn from the railroad car.

A still further object of this invention is to provide a wheel mounted unloading fork which can have the wheel assembly easily detached from the fork unit whenever the wheel assembly is not needed.

A still further object of this invention is to provide a wheel mounted unloading fork wherein the tines of the fork can have their spaced apart distance varied to accommodate pallets and cubes of varying widths.

A still further object of this invention is to provide a wheel mounted unloading fork that is easily movable both in its loaded and unloaded conditions.

A still further object of this invention is to provide a wheel mounted unloading fork that is easy to operate and which can be operated in the loading and unloading area by a single person.

A still further object of this invention is to provide a wheel mounted unloading fork that is safe to operate.

A still further object of this invention is to provide a wheel mounted unloading fork that is economical of manufacture and durable of use.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

FIGURE 1 is a side elevational view of the device of this invention as it is being wheeled to the location of the material to be moved;

FIGURE 2 is a side elevation of the device of this invention after it has been moved into a lifting position with respect to a pallet supported load;

FIGURE 3 is a side elevation of the device of this invention after the cable lever arms have been moved from the position in FIGURE 2 to an operational position whereupon the withdrawing cable can pull the entire unit to the desired location after the cable is secured to the unit;

FIGURE 4 is a side elevation of the device of this invention as it is being removed from a pallet supported load after the load has been moved to the desired position;

FIGURE 5 is a side elevational view of the fork unit supporting brackets which interconnect the fork unit and the wheel assembly;

FIGURE 6 is a frontal elevational view of the supporting bracket illustrated in FIGURE 5;

FIGURE 7 is a perspective view of the upper frame of the fork unit and shows the details of the cable carriage;

FIGURE 8 is a plan view of the wheel assembly;

FIGURE 9 is a side elevational view of the wheel assembly when the brakes have been released and the loaded unit is being withdrawn, as illustrated in the operation of FIGURE 3;

FIGURE 10 is an elevational view of the wheel assembly similar to FIGURE 9 but shows the forward wheels in a locked position as would be the case when the unit was in the operational position shown in FIGURE 2. This FIGURE 10 also illustrates the details of the overriding clutch assembly in the forward wheels which permit the unit to be moved forwardly even when the brake means is engaged;

FIGURE 11 is a perspective view of the fork unit in a removed condition from the wheel assembly;

FIGURE 12 is an elevational view of an alternate overriding clutch assembly for the forward wheels;

FIGURE 13 is an elevational view of the clutch assembly of FIGURE 12 taken at right angles to the view of FIGURE 12;

FIGURE 14 is a partial sectional view of an alternate forward axle assembly;

Figures 15, 16:
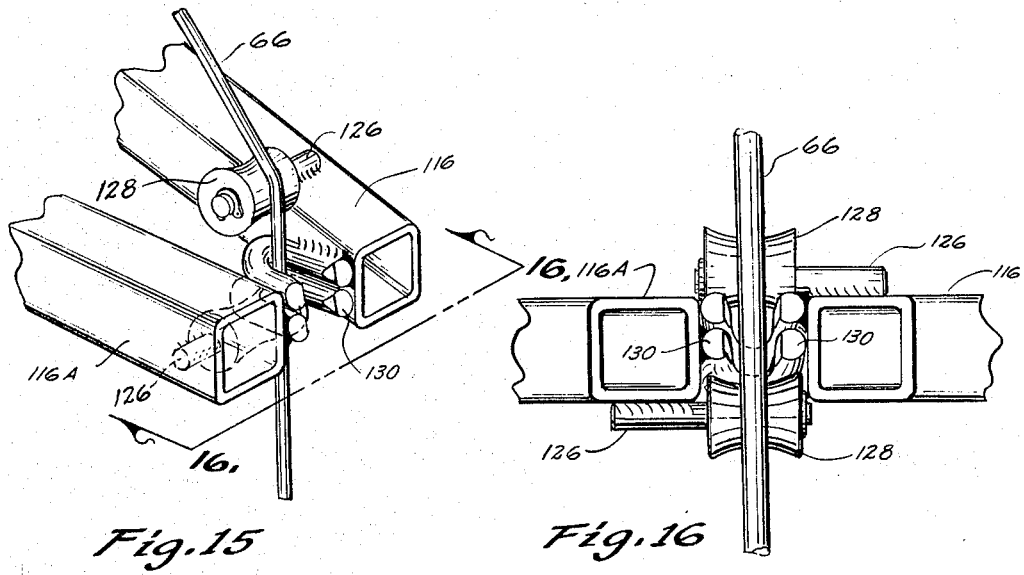
FIGURE 15 is a partial perspective view of the forward end of thte cable lever arms.
FIGURE 16 is a frontal elevational view of the forward ends of the cable lever arms as viewed on line 16—16 of FIGURE 15.

The numeral 10 generally designates the fork unit which is shown in its assembled condition in FIGURE 11. The numeral 12 generally designates the wheel assembly which is illustrated best in FIGURES 8 through 10. The fork unit and its component parts, as illustrated in FIGURES 7, 11, and 15 through 17, will first be described.

Vertical base frame members 14 have horizontal tines 16 extending forwardly from the bottom ends thereof. A plurality of horizontally extending holes 18 are aligned in a vertical position on the bottom portion of the frame members 14 for a purpose to be described hereafter. As shown in FIGURE 7, hollow bearing sleeves are rigidly secured to the upper end of each of the frame members 14. Ears 20 and 22 (FIGURE 11) are welded in a diagonally disposed position on the rearward faces of the frame members 14. A rod 24 extends through apertures in each of the ears 20 through similar apertures on the ears 22 on the opposite frame member 14. The ends of the rods 24 are threaded and conventional nut elements are disposed on opposite sides of the ears 20 and 22 so that the effective length of the rods can be selectively altered to change the distance between the opposite ear elements 20 and 22. This function is performed when the frame members 14 are being pivoted about the center axis of the bearing sleeves 19 to vary the lateral length between the tines 16.

Clip angles 26 are welded in an angular position to the inner face of each of the frame members 14. U-shaped guide sleeves 28 with downwardly extending tubes 30 and 30A mounted therein are pivotally secured to the clip angle 26 by pins 31. A small bar 32 extends laterally inwardly from the lower end of tube 30A and bar 34 extends laterally inwardly from the lower end of tube 30. The two bars 32 and 34 are pivotally secured together by means of pin 36.

With reference to FIGURE 7, upper frame 38 is comprised of two oppositely disposed channels 40 which are secured together at their forward ends by bar 42, and which are secured together at their rearward ends by angle 44. Parallel bearing plates 46 are angularly disposed in spaced apart condition and are welded to the outer faces of the channels 40 adjacent their rearward ends. Aligned apertures 48 appear in the bearing plates 46, and these apertures are adapted to register with the opposite ends of bearing sleeves 19 on the upper ends of frame members 14 of the fork unit. It should be noted that the longitudinal axes of the bearing sleeves 19 are not parallel to the longitudinal axis of upper frame 38, so that when pins 50 secure the bearing sleeves to the bearing plates 46, the frame members 14 do not form a right angle with the upper frame 38, but rather, the frame 38 extends forwardly and upwardly from the normally vertical axis of the frame members 14.

A carriage 52 is movably mounted on the upper flanges of the channels 40 as best illustrated in FIGURE 7. Carriage 52 includes an inverted U-shaped channel 54 which has a bottom portion 56 and side portions 58. Roller mounts 60 are rotatably secured to the outside faces of the sides 58 of carriage 52 and are adapted to rotatably engage the underside of the upper flanges of the channels 40. Pins 62 extend outwardly from the sides 58 of channel 54 at the extreme upper ends thereof to slidably engage the top surface of the upper flanges of channels 40. A cable eyelet 64 is secured to the bottom 56 of channel 54 by any convenient means and extends upwardly therefrom.

A cable 66 has its forward end secured by any convenient means to the bottom 56 of the carriage 52. The details of this rigid connection have not been illustrated in the drawings but this can be accomplished by any conventional means. The cable 66 is then threaded over a sheave 68 which is rotatably mounted on a sheave bracket 70 which in turn is rigidly secured to the angle 44 at the rearward end of the upper frame 38. Cable 66 then extends downwardly and around sheave 72 (FIGURE 11) and thence back upwardly towards the forward end of sheave bracket 70. Apertures 74 (FIGURES 7) in the forward end of the sheave bracket 70 are adapted to receive a conventional U-shaped cable clamp which has not been illustrated in the drawings. Thus, one end of the cable 66 is anchored to the sheave bracket 70 and the other end of the cable is anchored to the carriage 52. With reference to FIGURE 11, a sheave pin 76 extends through sheave 72 and a sheave bracket 78 is secured to the sheave pin 76 in conventional fashion. An elongated coil spring 80 has its upper end secured in any convenient means to sheave bracket 78 and its lower end extending through a suitable opening in bar 34 of tube 30. As shown in FIGURE 11, there are three apertures in bar 34 in which spring elements can be hooked. In the normal course of events, when the fork unit is attached to the wheel assembly, two auxiliary springs are secured by the lower ends to bar 34 on opposite sides of spring 80. The upper ends of the springs are then secured to the outer ends of sheave pin 76. When the wheel assembly is removed from the fork unit, these auxiliary springs are not needed and can either be removed from the fork unit or their upper ends can be removed from the sheave pin 76 and hooked in an inoperative position on the members 28, for example. The purpose of the spring elements is to effect the balance position of the carriage 52 according to the teachings of Bopp Patent No. 2,918,322 issued December 22, 1959.

The cable leverage assembly 82 includes lower bearing plates 84 (FIGURE 17) which have four holes 86 therein which are adapted to register with the four holes 88 in elements 46 on the upper frame. Bolts 90 (FIGURE 11) serve to secure the lower bearing plates 84 to the bearing plates 46 on the upper frame 38.

Again with reference to FIGURE 17, a U-shaped bracket has its ends rigidly secured to the lower bearing plates 84 by welding or the like, and a hollow tube 94 is in turn secured to the bracket 92. L-shaped slots 96 appear in tube 94 for a purpose to be discussed hereafter. Pins 98 are slidably mounted within tube 94 and are forcibly urged outwardly by spring 100. Latch pins 99 are secured to pins 98, and these latch pins extend through the L-shaped slots 96 to selectively retain the pins 98 in either a withdrawn or extended position with respect to tube 94. The ends of bracket 92 form cut out notches 102 to provide rotating clearance for the upper bearing plates 104.

Figure 17:
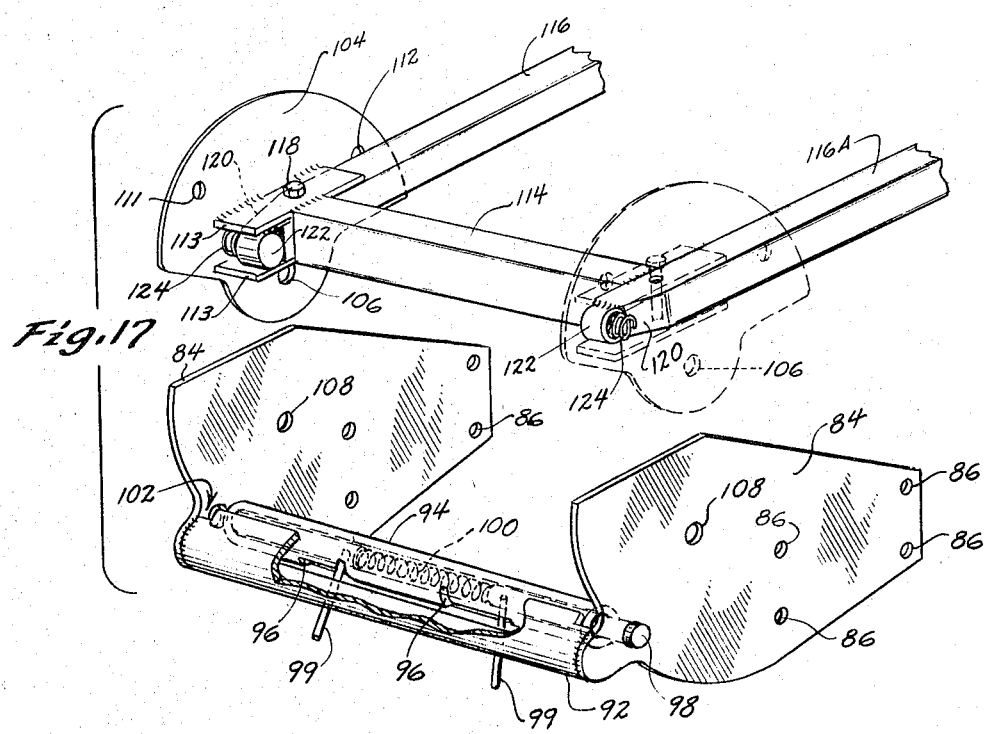
FIGURE 17 is a schematic view of the cable leverage assembly.

The upper bearing plates 104 have holes 106 therein which are adapted to register with the holes 108 in lower bearing plates 84. Nut and bolt assemblies 110 (FIGURE 11) are used to secure the upper bearing plates 104 to the lower bearing plates 84 by means of the registering holes 106 and 108. Holes 111 and 112 appear in upper bearing plates 104 at an equal distance from hole 106 and are adapted to register at times with the ends of pins 98 which are spring loaded within the tube 94. When the upper bearing plates 104 are pivoted to a position wherein the outer ends of pins 98 can enter the holes 111, the cable lever arms to be described hereafter will assume the position illustrated in FIGURE 3. When the holes 112 are permitted to register with and receive the ends of pins 98 through the pivoting of the plates 104, the cable lever arms will assume the position shown in FIGURE 2. With reference to FIGURE 17, the pins 98 can be selectively withdrawn into tube 94 by exerting pressure on latch pins 99, which serves to compress spring 100 as the latch pins move inwardly in the slots 96. The latch pins permit the selective withdrawal of the pins 98 from the holes 111 or 112 as the case may be.

As shown in FIGURE 17, parallel spaced apart bars 113 are welded to the inner face of the upper bearing plates 104 and a square tube 114 is welded by its ends to the center interior edges of the plates 113 to join the upper bearing plates together. Cable lever arms 116 and 116A have their rearward ends extending into the space between the bars 113 and the outer ends of tube 114. These arms are pivotally secured to bars 113 by means of pins 118. A tapered portion 120 appears on the outer face of the arms 116 and 116A at the rearward ends thereof to provide clearance for the forward ends of the arms to be pivoted towards each other at times. Sockets 122 are secured to the rearward ends of arms 116 and 116A at a point immediately rearwardly of the tapered portions 120, and springs 124 within sockets 122 bear against the inner face of the bearing plates 104 to normally urge the arms 116 and 116A to maintain a parallel condition.

As shown in FIGURES 15 and 16, stud shafts 126 are welded to and extend laterally inwardly from the bottom forward end of arm 116A and from the upper forward end of arm 116. Concave shaped rollers 128 are rotatably mounted on the shafts 126. A U-shaped bracket 130 is welded to the inner face at the forward end of each of the arms 116 and 116A. The bracket on arm 116A is disposed in a lower position than the bracket on arm 116 so that when the forward ends of the two arms are moved together, the brackets assume a superimposed position as illustrated in FIGURES 15 and 16. As shown in FIGURE 15, the closed end of the brackets 130 are substantial alignment with the concave rollers 128 when the forward ends of the arms 116 and 116A are moved together. As will be described hereafter, the lifting cable 131 of the boom is adapted to be secured to the cable eyelet 64 on carriage 52, and will then extend upwardly over the rollers 128 and the brackets 130 on the ends of arms 116 and 116A as shown in FIGURES 15 and 16.

The wheel assembly 12 includes a chassis 132 which has spaced apart rear bearing portions 134 which in turn rigidly receive shaft 136. Rear wheels 138 are mounted on the outer ends of shaft 136 and are permitted to freely rotate on the shaft. Forward bearing portions 140 are spaced apart and extend forwardly from chassis 132 as illustrated in FIGURES 8 and 9. Separate shafts 142 have their innermost ends extending through the bearing portions 140, although the inner ends of these shafts are not in engagement. The outer ends of these shafts terminate at a point beyond the outer ends of the rearward shaft 136 as illustrated in FIGURE 8. A slip clutch (FIGURE 10) 144 is rigidly keyed to the inner end of each of the shafts 142. A cylindrical brake drum 146 has two auxiliary drum portions 148 of smaller diameter integral with and extending laterally from the sides thereof. Slip clutches 144 are mounted within the auxiliary drum portions 148 as will be described hereafter. The ratchet gear 150 of clutch 144 is rigidly keyed to the shaft 142. Roller bearings 152 are mounted in race 154 and are adapted to engage the inner wall 156 of the auxiliary drums 148 at times. The clutch 144 is of conventional construction and the ratchet gear 150 thereof will bind the roller bearings 152 against the inner wall 156 of the drums 148 whenever the shafts 142 tend to rotate counter clockwise as viewed in FIGURE 10. This phenomenon serves to lock the auxiliary drums 148 and the brake drum 146 to the shafts 142 whenever there is any force exerted on the wheel assembly 12 to move it in a rearward direction or to the left as viewed in FIGURE 10. By contrast, whenever the wheel assembly is pushed forwardly, or to the right as viewed in FIGURE 10, the ratchet gear 150 will merely rotate the race 154 and the roller bearings 152 about the inner wall 156 of the auxiliary drums 148. Thus, this releasable clutch will free the shafts 142 from the auxiliary drums 148 and the brake drum 146 whenever the wheel assembly 12 is pushed forwardly. A circular brake band 158 with a brake lining 160 on the inner periphery thereof embraces the outer surface of the brake drum 146 as shown in FIGURE 10. A bracket 162 is secured to the brake band 158 and the brake lining 160 by means of rivets 164, and the bracket 162 is then in turn rigidly secured to the forward end of the chassis by means of bolts 166. Brackets 168 are secured to the two free rearward ends of the brake band 158 by means of rivets or the like. A pin 170 is slidably inserted through registering openings in each of the brackets 168 and the chassis 132. Nut elements 171 on the lower end of the pin 170 serve to selectively adjust the position of the pin with respect to the brackets 168. An eyelet 172 is formed on the upper end of pin 170.

Ear 174 extends upwardly from chassis 132 at a point rearwardly of pin 170 and links 176 have their rearward ends pivotally secured to the upper end of 174. A link 178 is eccentrically pivotally secured to the forward ends of links 176 and the eyelet 172 on pin 170 by pin 179. Bars 180 have their rearward ends pivotally secured to the upper end of eccentric link 178 and the forward ends of bars 180 are pivotally secured in any convenient manner to rearwardly extending ear 182 which is rigidly secured to transversely extending tube 184.

Clamps 186 secure the upper forward ends of cylinder members 188 to the rearward portion of tube 184. The rearward lower ends of cylinder members 188 are open and are telescopically received within the open forward ends of cylinder members 190. A spring 192 is housed within the two telescoping members 188 and 190 as shown in FIGURE 10. A pin 194 pivotally secures the lower end of cylinder members 190 to an upstanding ear 196 on the rearward end of chassis 132.

An ear 198 is rigidly secured on the upper portion of one of the cylinder members 190, and the lower end of a length adjustable link 200 is pivotally secured thereto by any convenient means. The other end of the length adjustable link 200 is pivotally secured to the substantial center of the wheel release bar 202 as shown in FIGURES 9 and 10. The forward end of the brake release bar 202 is pivotally secured to ear 204 which extends rearwardly from tube 184 by means of pin 206.

Forward wheel members 212 and 214 are keyed in spaced relation to the outer ends of the shaft members 142. Frame members 216 rotatably embrace the shafts 142 in between the wheel members 212 and 214 and extend upwardly and forwardly from the shaft. Frame members 216 can be held against lateral movement on the shaft by means of snap rings or the like. The upper ends of frame members 216 are bolted to the outer ends of the tube 184.

The upper ends of frame members 216 terminate in a flat bearing surface 218. A bearing plate 220 (FIGURES 5 and 6) is secured to the bearing surface 218 by means of bolts 222. A U-shaped bracket 224 has its bottom web 226 in superimposed position on the bearing plate 220, and pivot element 228 pivotally secures the web 226 and the bracket 224 to the bearing plate 220. The side flanges 230 of the bracket 224 have a plurality of aligned holes 232 which are adapted to register with the holes 18 in vertical members 14 of fork unit 10. The members 14 of the fork unit are received between the side flanges 230 of bracket 224, and an appropriate pin extending through the registering holes 18 of the fork unit and holes 232 of the bracket 224 serve to secure the fork unit 10 to the wheel assembly 12.

An alternate slip clutch is illustrated in FIGURES 12 and 13. Conventional bearings 234 serve to support the inner ends of the shafts 142 within the outer ends of auxiliary drums 148. Caps 236 are keyed or otherwise secured to the inner ends of the shafts 142. Ears 238 and 240 extend outwardly from each of the caps 236 as shown in FIGURE 12. A ratchet finger 242 is pivotally secured to ear 240 by pin 244, and the opposite end of the ratchet finger is adapted to engage the ratchet teeth 246 which extend around the inner periphery 156 of the drums 148. Spring 248 interconnect the ratchet finger 242 and the ears 238 to yieldingly urge the ratchet finger into engagement with the ratchet teeth 246. The ratchet finger 242 will engage the ratchet teeth 246 to prevent the rearward or clockwise rotation of shaft 142, as viewed in FIGURE 12. However, the ratchet finger 242 will ride over the teeth 246 whenever the shaft 142 is rotated forwardly or in a counter clockwise direction as viewed in FIGURE 12.

The structure in FIGURE 14 illustrates a sectional view through an alternate brake drum 146B which is keyed directly to the shafts 142 by keys 250. This arrangement of structure embodies no overriding clutches such as the clutches 233 of FIGURE 12 and 144 of FIGURE 10.

The normal operation of the device of this invention is as follows. When it is desired to move the entire apparatus in an unloaded condition over a supporting surface to a point where the material to be moved is located, the cable leverage assembly 82 is moved to the position shown in FIGURE 1 to permit the entire unit to be used as a wheel barrow with the arms 116 and 116A serving as the wheel barrow handles. As previously indicated, the cable leverage assembly 82 will maintain the arms 116 and 116A in this transport position by means of the pins 98 (FIGURE 17) extending into the holes 112 in the upper bearing plates 104.

Upon reaching the cube of material or material loaded pallet, the device is tilted forwardly from the transport position shown in FIGURE 1 so that the forward wheels 212 and 214 engage the supporting surface. The elevation of the tines 16 with respect to the supporting surface and the wheel assembly 12 can be varied in the manner described above by inserting a pin through a desired hole 18 in the members 14 when the desired hole is in registering position with one of the holes 232 in the U-shaped brackets 224 on the forward end of the wheel assembly. The spaced apart distance between the tines 16 can assume one of four positions. The rods 24 which interconnect the two frame members 14 of the fork unit are loosened or tightened as the case may be so that the distance between the members 14 is the same as the distance between the the U-shaped brackets 224 on the forward end of the wheel assembly. The brackets 224 can be adjusted to create four different mounting positions. When each of the brackets 224 are pivoted to bear against the outer edge of the bearing plates 220, as illustrated in FIGURE 6, one mounting position is achieved. When the brackets 224 as viewed in FIGURE 6 are rotated 180 degrees, they will then bear against the inner half of the plate 220 by means of the eccentric pivot element 228 so that a second mounting position is achieved. If the mounting plates 220 on the two frame members 216 are interchanged, the two mounting positions of the brackets 224 on the plates 220, as described above, will create two additional mounting positions. The pivotal connection between the brackets 224 and the bearing plates 220 permit the brackets 224 to accommodate any vertical disalignment of the frame members 14 of the fork unit as these frame members are pivoted inwardly or outwardly to adjust the spaced apart distance between the tines 16.

After the elevation of the tines from the supporting surface has been adjusted to the desired height, and after the spaced apart distance between these tines has been determined according to the above procedure, the tines are then ready for insertion underneath the supporting pallet or into the cube of building blocks, as the case may be. If the wheel assembly is equipped with either of the slip clutches 144 or 233, the unit can be pushed forwardly into the cube even though the entire weight of the unit itself may be resting on the forward wheels. It is important to note that the brake band 158 and brake lining 160 (FIGURE 10) are normally in tight engagement with the brake drum 146. Thus, the forward axles or shafts 142 and the forward wheels are normally locked against rotation in a rearward direction. Rotation is achieved in a forward direction only because of the overriding clutch elements described above. FIGURE 2 illustrates a typical situation where the tines have been moved forwardly underneath a pallet with the weight of the unit substantially resting on the forward wheels 212 and 214.

After the tines 16 have been inserted into the cube or under the pallet as indicated above, the pins 98 are withdrawn in the manner indicated from the holes 112 of upper bearing plates 104, and the arms 116 and 116A are then pivoted forwardly to the position shown in FIGURE 3. The arms 116 and 116A are locked in this position by allowing the spring loaded pin 98 to move into the holes 111 in the upper bearing plates 104.

The forward ends of arms 116 and 116A are then pivoted towards each other and the cable 131 is first secured to the cable eyelet 64 on carriage 52, and it is then threaded over the forward ends of arms 116 and 116A in the manner previously described and illustrated in FIGURES 15 and 16. The wheel release lever 202 is in the upper position shown by the solid lines in FIGURE 10 and the brake band 158 is in tight engagement with the brake drum 146 to prevent the rearward rotation of the forward wheels. As indicated in FIGURE 3, the pulling cable 131 extends rearwardly from the upper ends of the arms 116 and 116A as will be the case if the unit were being pulled outwardly from a railroad car for example. The upwardly and forwardly extending arms 116 and 116A enable the cable 131 to exert sufficient leverage on the unit to tilt the unit slightly backwardly as will be described hereafter. If the center of gravity of the load were closer to the frame members 14 of the fork unit, or if the members 14 were longer and extended higher, the cable 131 could be secured to the high point on the fork and the arms 116 and 116A could be eliminated. However, the pivotal arms 116 and 116A do permit the size of the fork unit 10 to be more compact since they can be folded to an out of the way position when not in use.

It should be noted that the carriage 52 is normally positioned on the rearward end of the upper frame 38 and is held in this rearward position by the cable 66 and the spring 80 on the fork unit. As indicated above, auxiliary springs are usually employed along with spring 80 in the manner indicated when the wheel assembly is attached to the fork unit. These springs serve to limit the free movement of the carriage 52 on the channels 40 of the upper frame 38 so that the entire fork unit and wheel assembly will maintain a balanced position if the entire unit is lifted from the supporting surface by the lifting cable 131. The balanced position of the carriage 52 on the channels 40 of the upper frame 38 during the pulling operation illustrated in FIGURE 3 is not of great importance. However, the carriage 52 will move from its normal rearmost position on frame 38 to a position slightly forwardly of the forward ends of the elevated arms 116 and 116A (FIGURE 3) when horizontal pulling pressure is exerted upon the cable 131. The approximate position of carriage 52 during this phase of the operation is illustrated in FIGURE 3.

As a pulling force is exerted on the cable 131 in a rearward direction as viewed in FIGURE 3, and since the forward wheels of the wheel assembly are in a locked condition, the cable 131 will impose an overturning movement on the entire unit about the point where the forward wheels engage the supporting surface. As the entire unit starts to pivot rearwardly, the rearward wheels 138 forcibly engage the supporting surface, and the continued rearward pivoting of the unit causes a compression of the spring 192 in the cylinders 188 and 190. This in effect permits the fork unit and the tube 184 to pivot towards the rearward wheels 138 which can pivot no more because of their tight and forcible engagement with the supporting surface. As the tube 184 continues to move rearwardly as the cylinders 188 and 190 close upon each other, the bars 180 force the top of the eccentric link 178 to pivot rearwardly downwardly about pin 179 towards a position parallel to link 176. This reduces the leverage imposed upon the upper bracket 168 which embraces the upper end of pin 170, and with the reduction of this leverage, the brackets 168 have a tendency to slide slightly away from each other on pin 170 which serves to reduce the tension exerted on the brake drum 146 by the brake band 158. As this leverage upon bracket 168 by the lower end of eccentric link 178 is lessened, the brake band 158 loosens its frictional grip on the brake drum 146 which in turn releases the shafts 142 and the forward wheels 212 and 214 for rotation in a rearward direction.

If the tension on the pulling cable 131 slackens for any reason during the reaward movement of the unit, and the unit is allowed to pivot slightly forwardly, the above described action of the bars 180, the eccentric link 178 and the brackets 78 will be reversed and the lower end of the eccentric link 178 will once again tightly bear against the bracket 168 to cause the brake band to tighten on the brake drum. Thus, the wheel assembly is completely under control at all times during the movement thereof in a rearward direction under loaded conditions.

After the unit has been pulled to a dock or the like so that the cable 131 from an overhead boom assumes a substantially vertical position, the cable 131 will automatically disengage the forward ends of the arms 116A and these arms will automatically separate and free themselves from the cable. They can then be pivoted to a horizontal position by disengaging the pins 98 from the holes 111 in the upper bearing plates as indicated above. If desired, the loaded fork unit with the wheel assembly attached can be lifted from the docks by the overhead boom and lifting cable 131 if desired.

When it is desired to remove the fork unit from the cube, the wheel release lever 202 is forced downwardly from the position of FIGURE 2 to the position of FIGURE 4. This action tends to pivot the fork unit 10 forwardly with respect to the chassis 132 and tilts the forward ends of the tines 16 into contact with the supporting surface or the lower surface of the holes of the block cube into which the tines extend. In either event, the downward movement of the wheel release lever "arches" the center of the unit so that it is supported by the forward ends of the tines and the rearward wheels, with the locked front wheels being raised from the supporting surface as shown in FIGURE 4. When the solid shaft device of FIGURE 14 is used, the wheel release lever 202 must be employed as described above to move the unit either into or out of the cube. After the forward wheels have been raised from the supporting surface as described, the cable 131 can be used to pull the fork unit out of the cube.

At times, it may be desirable to utilize the fork unit 10 without utilizing the wheel assembly 12. In such as instance, the pins which interconnect the brackets 224 on the forward end of the wheel assembly with the frame members 14 of the fork unit are removed and the fork unit is thereupon quickly and easily separated from the wheel assembly.

It is therefore seen that this invention will accomplish at least all of its stated objectives.

Some changes may be made in the construction and arrangement of my wheel mounted unloading fork without departing from the real spirit and purpose of my invention, and it is my intention to cover by my claims, any modified forms of structure or use of mechanical equivalents which may be reasonably included within their scope.

I claim:
1. A device of the class described,
a wheel assembly having forward and rearward ends,
a fork means secured to the forward end of said wheel assembly,
brake means on said wheel assembly normally braking said wheel assembly against movement in at least a rearward direction,
said brake means including means responsive to a rearward tilting action of said device to release said brake means for rearward movement to place the weight of said fork means and any load thereon upon said wheel assembly.

2. A device of the class described,
a fork means including a base frame with a load engaging portion extending outwardly in one direction therefrom,
a wheel assembly secured to said base frame opposite to said load engaging portion,
arm means on said base frame adapted to engage a cable means whereby a substantially horizontal pulling force on said cable means will tilt said fork means to an elevated position with respect to a horizontal supporting surface and impose the entire weight thereof on said wheel assembly,
an upper frame extending outwardly over said load engaging portion from the top of said base frame,
a carriage movably mounted on said upper frame, and
resilient means interconnecting said base frame and said carriage to yieldingly limit the movement of said carriage thereon,
said arm means being angularly disposed above said upper frame and being adapted to engage at their outer ends a cable means extending upwardly from said carriage.

3. A device of the class described,
a fork means including a base frame with a load engaging portion extending outwardly in one direction therefrom,
a wheel assembly secured to said base frame opposite to said load engaging portion,
arm means on said base frame adapted to engage a cable means whereby a substantially horizontal pulling force on said cable means will tilt said fork means to an elevated position with respect to a horizontal supporting surface and impose the entire weight thereof on said wheel assembly,
said arm means comprising two arms with means connecting said arms to said base frame to permit said arms to be selectively pivoted towards or away from each other, or to be pivoted with respect to said base frame.

4. A device of the class described,
a fork means including a base frame with a load engaging portion extending outwardly in one direction therefrom,
a wheel assembly secured to said base frame opposite to said load engaging portion,
arm means on said base frame adapted to engage a cable means whereby a substantially horizontal pulling force on said cable means will tilt said fork means to an elevated position with respect to a horizontal supporting surface and impose the entire weight thereof on said wheel assembly,
said fork means including an upper frame,
said base frame including two spaced apart vertical members pivotally secured at their upper ends to said upper frame for pivotal movement towards or away from each other,
means on said base frame for adjusting the pivotal position of said vertical members,
and time elements secured to and extending outwardly from the lower ends of said vertical members.

5. A device of the class described,
a fork means including a base frame with a load engaging portion extending outwardly in one direction therefrom,
a wheel assembly secured to said base frame opposite to said load engaging portion,
arm means on said base frame adapted to engage a cable means whereby a substantially horizontally pulling force on said cable means will tilt said fork means to an elevated position with respect to a horizontal supporting surface and impose the entire weight thereof on said wheel assembly,
said fork means including an upper frame,
said base frame including two spaced apart vertical members pivotally secured at their upper ends to said upper frame for pivotal movement towards or away from each other,
means on said base frame for adjusting the pivotal position of said vertical members,
mounting brackets pivotally secured to the forward end of said wheel assembly,
means for securing said mounting brackets to said vertical members, and time elements secured to and extending outwardly from the lower ends of said vertical members.

6. A device of the class described,
a fork means including a base frame with a load engaging portion extending outwardly in one direction therefrom,
a wheel assembly secured to said base frame opposite to said load engaging portion,
arm means on said base frame adapted to engage a cable means whereby a substantially horizontal pulling force on said cable means will tilt said fork means to an elevated position with respect to a horizontal supporting surface and impose the entire weight thereof on said wheel assembly,
said wheel assembly including a chassis,
first tandem wheel means mounted on said chassis adjacent said fork means,
brake means on said wheel means normally holding said first tandem wheel means against rotation in at least one direction,
second tandem wheel means mounted on said chassis adjacent said first tandem wheel means, and
a brake release means connecting said brake means and said second tandem wheel means whereby when the entire weight of said fork means is tilted and imposed on said first and second tandem wheel means, said brake means will release said first tandem wheel means for rotation.

7. A device of the class described,
a wheel assembly,
a load engaging means pivotally mounted on the forward end of said wheel assembly,
brake means on said wheel assembly normally braking said wheel assembly against movement in at least a rearward direction,
and connecting means interconnecting said brake means and said load engaging means to release said brake means to free said wheel assembly for movement when said load engaging means is pivoted in one direction with respect to said wheel assembly,
said wheel assembly including an over-riding clutch which permits movement of said wheel assembly in one direction even when said brake means is normally in a position to brake said wheel assembly against movement.

8. A device of the class described,
a wheel assembly,
a load engaging means pivotally mounted on the forward end of said wheel assembly,
brake means on said wheel assembly normally braking said wheel assembly against movement in at least a rearward direction,
connecting means interconnecting said brake means and said load engaging means to release said brake means to free said wheel assembly for movement when said load engaging means is pivoted in one direction with respect to said wheel assembly,
said wheel assembly including a chassis,
first tandem wheels mounted on a shaft on the forward end of said chassis adjacent said fork means,
brake means on said shaft normally holding said first tandem wheel against rotation in at least a rearward direction,
second tandem wheels freely mounted for rotation on the rearward end of said chassis,
frame supports rotatably mounted on said shaft and extending forwardly of said chassis to engage said load engaging means,
resilient means connecting said chassis and said frame supports to yieldingly resist the rearward pivotal movement of said frame supports on said shaft,
and brake release means interconnecting said frame supports, said chassis and said brake means to release said brake from said first tandem wheels when said frame supports and the rearward end of said chassis are rotated towards each other.

9. A device of the class described,
a wheel assembly,
a load engaging means pivotally mounted on the forward end of said wheel assembly,
brake means on said wheel assembly normally braking said wheel assembly against movement in at least a rearward direction,
connecting means interconnecting said brake means and said load engaging means to release said brake means to free said wheel assembly for movement when said load engaging means is pivoted in one direction with respect to said wheel assembly,
said load engaging means being a fork means including a base frame with a load engaging portion extending forwardly therefrom,
and arm means on said base frame adapted to engage a cable means whereby a substantially horizontal pulling force on said cable means will tilt said fork means to an elevated position with respect to a horizontal supporting surface and impose the entire weight thereof on said wheel assembly.

10. The device of claim 6 wherein said first tandem wheel means includes an overriding clutch which will permit rotation of said first tandem wheel means in another direction even when said brake means is holding said first tandem wheels against rotation in one direction.

11. The device of claim 8 wherein said brake means includes a brake drum on said shaft with a brake band having two ends extending substantially around the outer perimeter of said drum, pin means movably joining the ends of said brake band, said brake means including an eccentrically mounted link adapted to bear against at least one end of said brake band to draw the ends thereof together to tightly engage said brake drum, said eccentrically mounted link being moved out of strong bearing engagement with the ends of said brake band to loosen said brake band on said brake drum and to release said first tandem wheels for rotation when said frame supports and the rearward end of said chassis are rotated towards each other.

12. The device of claim 11 wherein an overriding clutch interconnects said shaft and said brake drum to permit rotation of said shaft and said first tandem wheels in a forward direction even when said brake band is holding said brake drum against rotation.

13. The device of claim 9 wherein connecting means interconnect said base frame and said wheel assembly whereby the position of said base frame with respect to said wheel assembly can be varied between predetermined fixed positions.

14. The device of claim 9 wherein the load engaging portion of said base frame is a pair of tines, and means on said fork means for changing the lateral distance between said tines.

15. The device of claim 9 wherein said fork means includes means for adjusting the angular position of said arms with respect to said base frame.

16. The device of claim 9 wherein an upper frame extends outwardly over said load engaging portion from the top of said base frame, a carriage is movably mounted on said upper frame, resilient means interconnecting said base frame and said carriage to yieldingly limit the movement of said carriage thereon, said arm means being angularly disposed above said upper frame and being adapted to engage at their outer ends a cable means extending upwardly from said carriage.

17. The device of claim 9 wherein said arm means comprises two arms with means connecting said arms to said base frame to permit said arms to be selectively pivoted towards or away from each other, or to be pivoted with respect to said base frame.

18. The device of claim 9 wherein said fork means includes an upper frame, and said base frame includes two spaced apart vertical members pivotally secured at their upper ends to said upper frame for pivotal movement towards or away from each other, means on said base frame for adjusting the pivotal position of said vertical members, and tine elements secured to and extending outwardly from the lower ends of said vertical members.

19. The device of claim 9 wherein said fork means includes an upper frame, and said base frame includes two spaced apart vertical members pivotally secured at their upper ends to said upper frame for pivotal movement towards or away from each other, means on said base frame for adjusting the pivotal position of said vertical members, mounting brackets pivotally secured to the forward end of said wheel assembly, means for securing said mounting brackets to said vertical members, and tine elements secured to and extending outwardly from the lower ends of said vertical members.

References Cited by the Examiner
UNITED STATES PATENTS

| | | | |
|---|---|---|---|
| 489,339 | 1/1893 | Stephens | 214—110 |
| 1,207,433 | 12/1916 | Norman | 280—47.79 X |
| 1,882,036 | 10/1932 | Remde | 214—673 |
| 2,682,349 | 6/1954 | Jackson | 214—674 |
| 3,044,832 | 7/1962 | McMannus. | |
| 3,088,614 | 5/1963 | Summers | 214—653 |
| 3,217,912 | 11/1965 | McKeon | 214—62 |

GERALD M. FORLENZA, *Primary Examiner.*

ALBERT J. MAKAY, *Examiner.*